US009838196B2

United States Patent
Ogawa

(10) Patent No.: US 9,838,196 B2
(45) Date of Patent: Dec. 5, 2017

(54) SYNCHRONIZATION APPARATUS, SYNCHRONIZATION SYSTEM, RADIO COMMUNICATION APPARATUS AND SYNCHRONIZATION METHOD

(71) Applicant: NEC Corporation, Tokyo (JP)

(72) Inventor: Takatoshi Ogawa, Tokyo (JP)

(73) Assignee: NEC Coporation, Tokyo (JP)

(*) Notice: Subject to any disclaimer, the term of this patent is extended or adjusted under 35 U.S.C. 154(b) by 252 days.

(21) Appl. No.: 14/647,324

(22) PCT Filed: Aug. 15, 2013

(86) PCT No.: PCT/JP2013/004862
§ 371 (c)(1),
(2) Date: May 26, 2015

(87) PCT Pub. No.: WO2014/083725
PCT Pub. Date: Jun. 5, 2014

(65) Prior Publication Data
US 2015/0295702 A1  Oct. 15, 2015

(30) Foreign Application Priority Data
Nov. 29, 2012  (JP) .................. 2012-260716

(51) Int. Cl.
H04W 4/00 (2009.01)
H04L 7/00 (2006.01)
(Continued)

(52) U.S. Cl.
CPC .......... *H04L 7/0016* (2013.01); *H04J 3/0638* (2013.01); *H04J 3/0644* (2013.01);
(Continued)

(58) Field of Classification Search
USPC ................. 370/324, 252, 395, 329
See application file for complete search history.

(56) References Cited

U.S. PATENT DOCUMENTS 6,329,858 B1   12/2001 Sobue
2009/0160564 A1*  6/2009 Cho .................. H03L 7/087
                                                          331/1 A
(Continued)

FOREIGN PATENT DOCUMENTS

JP    2000-138661 A    5/2000
JP    2010-273148 A   12/2010
(Continued)

OTHER PUBLICATIONS

International Search Report corresponding to PCT/JP2013/004862, dated Sep. 24, 2013, 1 page.

*Primary Examiner* — Zewdu A Beyen
(74) *Attorney, Agent, or Firm* — Wilmer Cutler Pickering Hale and Dorr LLP

(57) ABSTRACT

A synchronization apparatus capable of reducing the effect of the fluctuations in synchronization signals that are caused when the synchronization signals are received through a network are provided. A synchronization apparatus (20) according to the present invention receives a synchronization signal transmitted from a synchronization signal source (10) through a network. The synchronization apparatus (20) includes a frequency synchronization unit (21) that performs frequency synchronization based on a received synchronization signal, and outputs a frequency synchronization signal, a phase synchronization unit (23) that performs phase synchronization based on a synchronization signal transmitted from the synchronization signal source (10) through a network, and outputs a phase synchronization signal, and a phase synchronization control unit (22) that generates an offset value by using a phase difference between the frequency synchronization signal and the phase synchronization signal, and corrects a phase of the frequency synchronization signal by using the offset value.

13 Claims, 10 Drawing Sheets

(51) Int. Cl.
*H04W 56/00* (2009.01)
*H04J 3/06* (2006.01)

(52) U.S. Cl.
CPC ....... *H04J 3/0658* (2013.01); *H04W 56/0015* (2013.01); *H04W 56/0035* (2013.01); *H04J 3/0647* (2013.01); *H04J 3/0667* (2013.01)

(56) References Cited

U.S. PATENT DOCUMENTS

2010/0124241 A1* 5/2010 Hiramoto ................ G06F 9/522
370/509
2012/0079310 A1 3/2012 Matsusue et al.

FOREIGN PATENT DOCUMENTS

| JP | 2012-004914 A | 1/2012 |
| JP | 2012-074799 A | 4/2012 |

\* cited by examiner

SYNCHRONIZATION APPARATUS, SYNCHRONIZATION SYSTEM, RADIO COMMUNICATION APPARATUS AND SYNCHRONIZATION METHOD

CROSS-REFERENCE TO RELATED APPLICATIONS

This application is a national stage application of International Application No. PCT/JP2013/004862 entitled "SYNCHRONIZATION APPARATUS, SYNCHRONIZATION SYSTEM, RADIO COMMUNICATION APPARATUS AND SYNCHRONIZATION METHOD," filed on Aug. 15, 2013, which claims the benefit of the priority of Japanese Patent Application No. 2012-260716, filed on Nov. 29, 2012, the disclosures of each of which are hereby incorporated by reference in their entirety.

TECHNICAL FIELD

The present invention relates to a synchronization apparatus, a synchronization system, a radio communication apparatus, and a synchronization method. In particular, the present invention relates to a synchronization apparatus, a synchronization system, a radio communication apparatus, and a synchronization method for performing synchronization by using a synchronization signal transmitted from a synchronization signal source.

BACKGROUND ART

Techniques in which a signal broadcasted from a GNSS (Global Navigation Satellite System) satellite (i.e., a signal for synchronization) is received by a GNSS receiver, and a timing signal synchronized with the UTC (Universal Time, Coordinated) is output have been proposed in the past (see, for example, Patent Literature 1).

Further, in some cases, in order to enable a synchronization apparatus located in a place where it cannot directly receive the signal for synchronization from the GNSS satellite to use the synchronization signal, the GNSS receiver, which has received the synchronization signal from the GNSS satellite, transmits the synchronization signal to the synchronization apparatus through a network.

CITATION LIST

Patent Literature

Patent Literature 1: Japanese Unexamined Patent Application Publication No. 2010-273148

SUMMARY OF INVENTION

Technical Problem

However, when the GNSS receiver transmits the synchronization signal to the synchronization apparatus through an asynchronous network such as a packet network, fluctuations occur in synchronization signals received by the GNSS receiver due to congestion, a transmission delay, or the like in the network. Therefore, there is a problem that phase and time synchronization characteristics comparable to those of the GNSS cannot be obtained in a synchronization apparatus that receives a synchronization signal from the GNSS receiver through a network.

In order to the above-described problem, an object of the present invention is to provide a synchronization apparatus, a synchronization system, a radio communication apparatus, and a synchronization method capable of reducing the effect of the fluctuations in synchronization signals that are caused when the synchronization signals are received through a network.

Solution to Problem

A synchronization apparatus according to a first aspect in accordance with the present invention includes: a frequency synchronization unit that performs frequency synchronization based on a synchronization signal transmitted from a synchronization signal source through a network, and outputs a frequency synchronization signal; a phase synchronization unit that performs phase synchronization based on a synchronization signal transmitted from the synchronization signal source through a network, and outputs a phase synchronization signal; and a phase synchronization control unit that generates an offset value by using a phase difference between the frequency synchronization signal and the phase synchronization signal, and corrects a phase of the frequency synchronization signal by using the offset value.

A synchronization system according to a second aspect in accordance with the present invention includes: a synchronization signal source; a synchronization signal transmitting apparatus that converts a synchronization signal transmitted from the synchronization signal source into a signal in a physical layer and transmits the converted signal as a first synchronization signal, and transmits the synchronization signal as a second synchronization signal through a packet network; and a synchronization apparatus that generates a frequency synchronization signal by performing frequency synchronization based on the first synchronization signal, generates a phase synchronization signal by performing phase synchronization based on the second synchronization signal, and corrects a phase of the frequency synchronization signal by using an offset value, the offset value being generated by using a phase difference between the frequency synchronization signal and the phase synchronization signal.

A radio communication apparatus according to a third aspect in accordance with the present invention includes: a first synchronization signal receiving unit that receives a plurality of synchronization signals from a synchronization signal source through a network, the plurality of synchronization signals being used for frequency synchronization; a second synchronization signal receiving unit that receives a plurality of synchronization signals from the synchronization signal source through a network, the plurality of synchronization signals being used for phase synchronization; a frequency synchronization unit that performs frequency synchronization based on a synchronization signal selected in the first synchronization signal receiving unit, and outputs a frequency synchronization signal; a phase synchronization unit that performs phase synchronization based on a synchronization signal selected in the second synchronization signal receiving unit, and outputs a phase synchronization signal; and a phase synchronization control unit that generates an offset value by using a phase difference between the frequency synchronization signal and the phase synchronization signal, and corrects a phase of the frequency synchronization signal by using the offset value.

A synchronization method according to a fourth aspect in accordance with the present invention includes: performing frequency synchronization based on a synchronization signal transmitted from a synchronization signal source through a network, and outputting a frequency synchronization signal; performing phase synchronization based on a synchronization signal transmitted from the synchronization signal source through a network, and outputting a phase synchronization signal; and generating an offset value by using a phase difference between the frequency synchronization signal and the phase synchronization signal, and correcting a phase of the frequency synchronization signal by using the offset value.

Advantageous Effects of Invention

According to the present invention, it is possible to provide a synchronization apparatus, a synchronization system, a radio communication apparatus, and a synchronization method capable of reducing the effect of the fluctuations in synchronization signals that are caused when the synchronization signals are received through a network.

DESCRIPTION OF EMBODIMENTS

First Exemplary Embodiment

Exemplary embodiments according to the present invention are explained hereinafter with reference to the drawings. A configuration example of a synchronization system and a synchronization apparatus according to a first exemplary embodiment in accordance with the present invention is explained with reference to FIG. 1. A synchronization system shown in FIG. 1 includes a synchronization signal source 10 and a synchronization apparatus 20. The synchronization signal source 10 communicates with the synchronization apparatus 20 through a network 30.

The synchronization signal source 10 may be, for example, an apparatus that generates a synchronization signal synchronized with the UTC. Alternatively, the synchronization signal source 10 may be an apparatus that generates a synchronization signal synchronized with the Japan standard time, the TAI (the international atomic time), the GPS (Global Positioning System) time, or the like, which is used in synchronization with the UTC.

Figure 1:
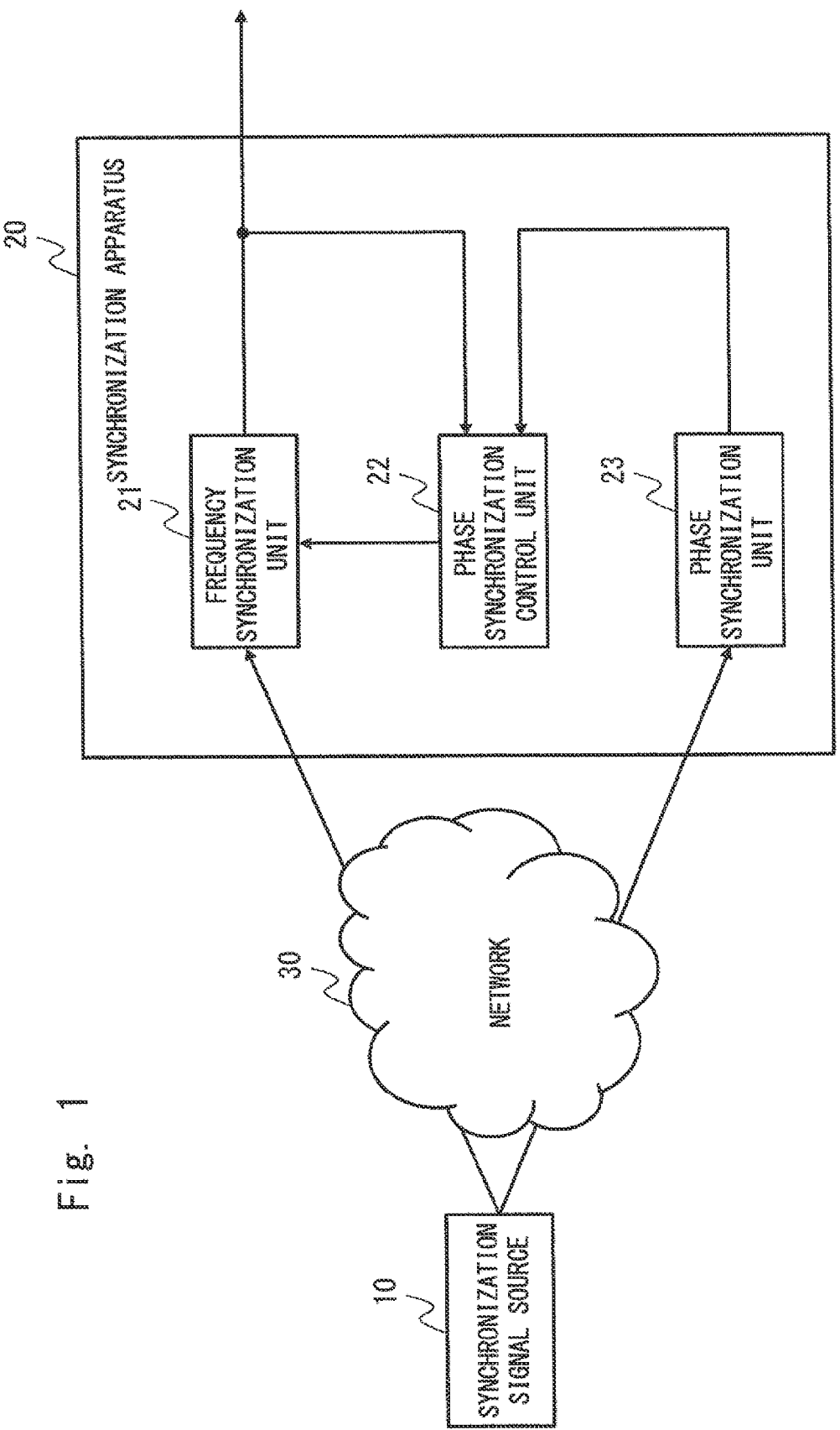
FIG. 1 is a configuration diagram of a synchronization system according to a first exemplary embodiment.

The network 30 may be, for example, a packet network through which packets are transmitted using the Ethernet (registered trademark) or an optical transmission network in which an SDH (Synchronous Digital Hierarchy) is used in its physical layer. Further, FIG. 1 shows a configuration in which only the network 30 is used between the synchronization signal source 10 and the synchronization apparatus 20. However, for example, different networks may be used for communication between the synchronization signal source 10 and a frequency synchronization unit 21 of the synchronization apparatus 20 and for communication between the synchronization signal source 10 and a phase synchronization unit 23 of the synchronization apparatus 20.

The synchronization apparatus 20 may be a single (or separate) apparatus that performs synchronization control, or may be an apparatus that carries out a plurality of functions. For example, the synchronization apparatus 20 may be formed as a part of a radio communication apparatus. A configuration example of the synchronization apparatus 20 is explained hereinafter.

The synchronization apparatus 20 includes a frequency synchronization unit 21, a phase synchronization control unit 22, and a phase synchronization unit 23. The frequency synchronization unit 21 performs frequency synchronization based on a synchronization signal transmitted from the synchronization signal source 10 through the network 30. That is, the frequency synchronization unit 21 generates a frequency synchronization signal synchronized with the frequency of the synchronization signal transmitted from the synchronization signal source 10. The frequency synchronization unit 21 outputs the generated frequency synchronization signal to a circuit(s) or the like constituting an external apparatus different from the synchronization apparatus 20, and to the phase synchronization control unit 22.

The phase synchronization unit 23 performs phase synchronization based on a synchronization signal transmitted from the synchronization signal source 10 through the network 30. That is, the phase synchronization unit 23 generates a phase synchronization signal synchronized with the phase of the synchronization signal transmitted from the synchronization signal source 10. The phase synchronization unit 23 outputs the generated phase synchronization signal to the phase synchronization control unit 22.

The phase synchronization control unit 22 obtains a phase difference between the frequency synchronization signal output from the frequency synchronization unit 21 and the phase synchronization signal output from the phase synchronization unit 23. Further, the phase synchronization control unit 22 calculates an offset value that is applied to the frequency synchronization signal output from the frequency synchronization unit 21 by using the obtained phase difference. The frequency synchronization unit 21 outputs the calculated offset value to the frequency synchronization unit 21 and corrects the phase of the frequency synchronization signal.

As explained above, by using the synchronization apparatus 20 according to the first exemplary embodiment of the present invention, it is possible to generate an offset value by using the phase difference between the frequency synchronization signal and the phase synchronization signal and correct the phase of the frequency synchronization signal by using the generated offset value, rather than generating a synchronization signal by using only the frequency synchronization signal obtained in the phase synchronization unit 23. As a result, the synchronization apparatus 20 can generate a highly accurate synchronization signal.

Second Exemplary Embodiment

Next, a configuration example of a synchronization system according to a second exemplary embodiment of the present invention is explained with reference to FIG. 2. A synchronization system shown in FIG. 2 includes a GNSS satellite 11, a GNSS receiver 12, a synchronization signal transmitting apparatus 13, and a synchronization apparatus 20. Further, the synchronization signal transmitting apparatus 13 is connected with the synchronization apparatus 20 through a network 30. Note that the following explanations are given while assigning symbols similar to those in FIG. 1 to apparatuses similar to those in the configuration shown FIG. 1.

The GNSS satellite 11 transmits a GNSS broadcast signal synchronized with the UTC. Note that the term "GNSS" is a general term for navigation satellite system including GPS, GLONASS, Galileo, Compass, quasi-zenith satellite systems (QZSS), and so on. The GNSS receiver 12 receives the GNSS broadcast signal transmitted from the GNSS satellite 11, reproduces a synchronization signal based on the received GNSS broadcast signal, and transmits the reproduced synchronization signal to the synchronization signal transmitting apparatus 13.

The synchronization signal transmitting apparatus 13 transmits the synchronization signal to the synchronization apparatus 20 through the network 30. The synchronization signal is, for example, a clock signal generated by using the GNSS broadcast signal. Note that the synchronization signal transmitting apparatus 13 transmits the synchronization signal by using a method specified in, for example, IEEE1588 (hereinafter called "IEEE1588 transmission") and a Synchronous Ethernet (registered trademark) (hereinafter expressed as "SyncE") method. The IEEE1588 transmission and the SyncE transmission are performed through the Ethernet (registered trademark). Further, the IEEE1588 may also be referred to as "PTP (Precision Time Protocol)".

As explained above with reference to FIG. 1, the synchronization apparatus 20 generates a frequency synchronization signal synchronized with the frequency of the synchronization signal transmitted from the synchronization signal transmitting apparatus 13 and a phase synchronization signal synchronized with the phase of the synchronization signal transmitted from the synchronization signal transmitting apparatus 13.

Figure 3:
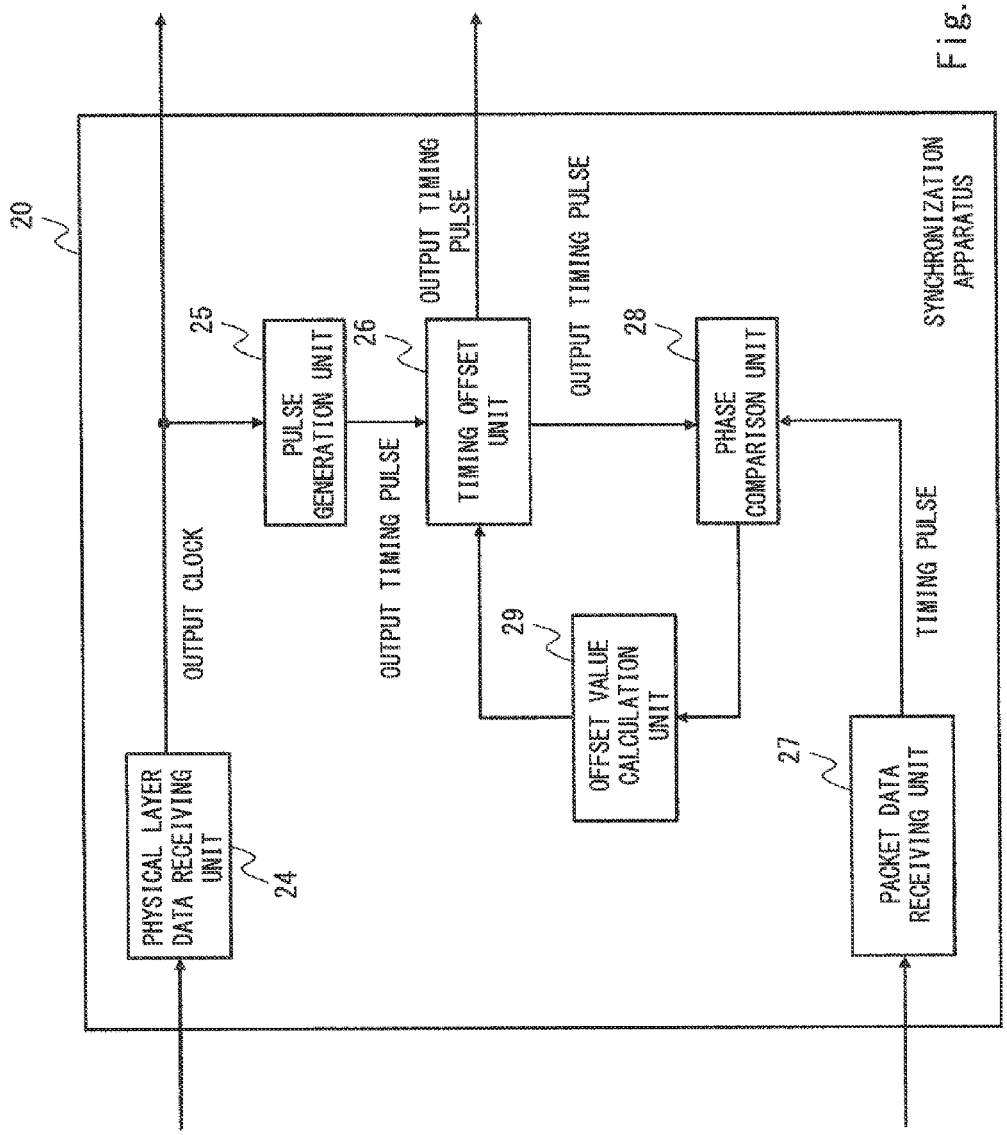
FIG. 3 is a configuration diagram of a synchronization apparatus according to the second exemplary embodiment.

Next, a detailed configuration example of the synchronization apparatus 20 according to the second exemplary embodiment of the present invention is explained with reference to FIG. 3. The synchronization apparatus 20 shown in FIG. 3 includes a physical layer data receiving unit 24, a pulse generation unit 25, a timing offset unit 26, a packet data receiving unit 27, a phase comparison unit 28, and an offset value calculation unit 29. Note that the physical layer data receiving unit 24 and the pulse generation unit 25 correspond to the frequency synchronization unit 21 in FIG. 1. Further, the packet data receiving unit 27 corresponds to the phase synchronization unit 23. Further, the timing offset unit 26, the phase comparison unit 28, and the offset value calculation unit 29 correspond to the phase synchronization control unit 22.

The physical layer data receiving unit 24 receives a synchronization signal transmitted from the synchronization signal transmitting apparatus 13 through a physical layer of a SyncE transmission path. The physical layer data receiving unit 24 is formed by, for example, using a phase synchronization circuit (or PLL: Phase-Locked Loop). The physical layer data receiving unit 24 synchronizes the frequency of a signal generated by using an oscillator with the frequency of the synchronization signal transmitted from the synchronization signal transmitting apparatus 13 by using the PLL circuit. The physical layer data receiving unit 24 outputs the signal, whose frequency has been synchronized with that of the synchronization signal transmitted from the synchronization signal transmitting apparatus 13, as an output clock. The physical layer data receiving unit 24 outputs the output clock to the pulse generation unit 25, a circuit(s) located outside the synchronization apparatus 20, and so on.

The pulse generation unit 25 generates an output timing pulse based on the output clock output from the physical layer data receiving unit 24. For example, the pulse generation unit 25 extracts the clock timing of the output clock and thereby generates a pulse signal as an output timing pulse. Note that the clock timing is, for example, the rising timing or the falling timing of the output clock. The pulse generation unit 25 outputs the generated output timing pulse to the timing offset unit 26. Further, the timing offset unit 26 outputs the output timing pulse to the phase comparison unit 28.

Figure 4A:
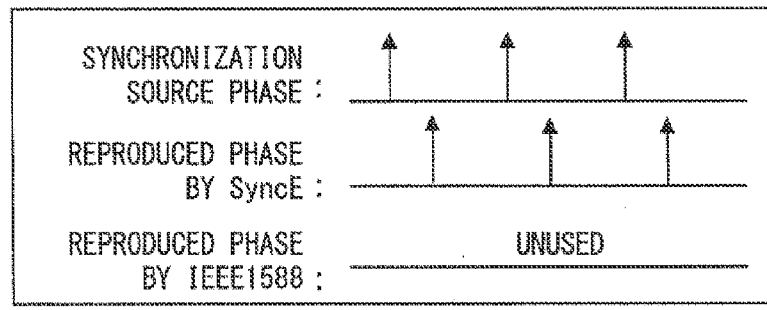
FIG. 4A is a diagram for explaining a phase deviation of a pulse signal according to the second exemplary embodiment.

Note that the physical layer data receiving unit 24 receives a synchronization signal that is transmitted through a physical layer. Therefore, even when a number of packet data, which correspond to a layer higher than the physical layer, are transmitted and hence congestion occurs in the network 30, the congestion does not directly affect the transmission of the synchronization signal transmitted through the physical layer. Therefore, no fluctuation occurs in synchronization signals received by the physical layer data receiving unit 24. That is, when the pulse generation unit 25 generates output timing pulses by using the output clock output from the physical layer data receiving unit 24, the pulse intervals of the generated output timing pulses are the same as the pulse intervals of the synchronization signal reproduced by the GNSS receiver 12 based on the GNSS broadcast signal. However, the synchronization signal transmitted through the physical layer includes no phase information. Therefore, as shown in FIG. 4A, a phase deviations occurs between the synchronization source phase and the reproduced phase by the SyncE. The synchronization source phase means the synchronization signal output by the synchronization signal transmitting apparatus 13, and the reproduced phase by the SyncE means the output timing pulse. Note that the synchronization signal is shown in the form in which the synchronization signal is converted into a pulse signal. Further, FIG. 4A also shows that the pulse interval of the reproduced phase by the SyncE is equal to the pulse interval in the pulse signal generated based on the synchronization signal of the synchronization source (i.e., the pulse signal generated based on the synchronization signal reproduced by the GNSS receiver 12 based on the GNSS broadcast signal).

The packet data receiving unit 27 receives a synchronization signal transmitted through the IEEE1588 transmission. The packet data receiving unit 27 receives a synchronization signal that is transmitted as packet data. For example, when the synchronization signal transmitting apparatus 13 serves as a PTP (Precision Time Protocol) server, the packet data receiving unit 27 may serve as a PTP client. The packet data receiving unit 27 generates timing pulses, which are a pulse signal, based on the received synchronization signal. As for the method for generating timing pulses based on the synchronization signal received through the IEEE1588 transmission, a commonly used method may be used. Further, the method is not limited to any particular methods. The packet data receiving unit 27 outputs the generated timing pulses to the phase comparison unit 28.

Figure 4B:
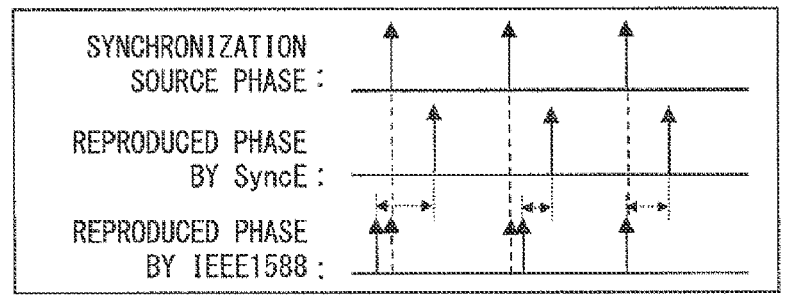
FIG. 4B is a diagram for explaining a phase deviation of a pulse signal according to the second exemplary embodiment.

The synchronization signal transmitted through the IEEE1588 transmission includes phase information. Therefore, fundamentally, the phase of the timing pulses coincides with the phase of the synchronization signal output by the synchronization signal transmitting apparatus 13. However, fluctuations occur in synchronization signals transmitted through the IEEE1588 transmission because of the state of the network between the synchronization signal transmitting apparatus 13 and the packet data receiving unit 27 such as a congested state, network switching, a band change, an AMR (Adaptive Modulation Radio) in radio transmission, and so on. Therefore, as shown in FIG. 4B, a deviation occurs between the phase of the pulse signal generated based on the synchronization signal of the synchronization source (i.e., the pulse signal generated based on the synchronization signal reproduced by the GNSS receiver 12 based on the GNSS broadcast signal) and that of the timing pulses. The reproduced phase by the IEEE1588 in FIG. 4B represents the clock timings of the timing pulses. Note that in the reproduced phase by the IEEE1588, the vertical dotted-line arrows indicate clock timings when the reproduced phase coincides with the phase of the pulse signal generated based on the synchronization signal of the synchronization source. The solid-line arrows indicate actually generated timing pulses. When the actually generated timing pulse coincides with the clock timing of the pulse signal generated based on the synchronization signal of the synchronization source, only the solid-line arrow is drawn. This also holds true in the following explanations.

The phase comparison unit 28 compares the output timing pulses output from the timing offset unit 26 with the timing pulses output from the packet data receiving unit 27. Specifically, the phase comparison unit 28 calculates phase differences between the output timing pulses and the timing pulses as shown by the horizontal arrows in FIG. 4B. The phase difference between the output timing pulse and the timing pulse is calculated at each clock timing such as each rising timing. As a result, the phase comparison unit 28 has information about a plurality of phase differences.

The offset value calculation unit 29 statistically processes the information about a plurality of phase differences and thereby calculates an offset value to be applied to the output timing pulses. The offset value is a value that is uniformly applied to a plurality of clock timings. Further, the offset value is used to conform the phase of the output timing pulses with the pulse signal generated based on the signal of the synchronization source (e.g., the synchronization signal generated based on the GNSS broadcast signal transmitted from the GNSS satellite). For example, the offset value calculation unit 29 may use the average value of a plurality of phase differences as the offset value. Alternatively, the offset value calculation unit 29 may use the median among a plurality of phase differences as the offset value. Alternatively, the offset value calculation unit 29 may use the minimum value among a plurality of phase differences as the offset value. Note that when the offset value calculation unit 29 determines what kind of value is used as the offset value, the offset value calculation unit 29 may obtain a distribution of phase differences and determine that the average value, the median, or other values is used as the offset value according to the obtained distribution state of the phase differences. The offset value calculation unit 29 outputs the calculated offset value to the timing offset unit 26.

Figure 4C:
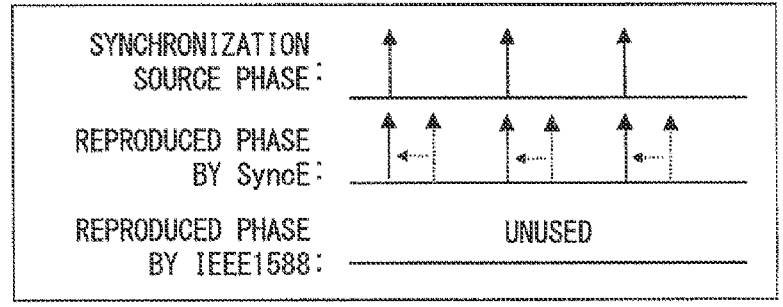
FIG. 4C is a diagram for explaining a phase deviation of a pulse signal according to the second exemplary embodiment.

As shown in FIG. 4C, the timing offset unit 26 applies the offset value to the output timing pulses and thereby controls the phase of the output timing pulses so that it conforms to the phase of the pulse signal generated based on the synchronization signal of the synchronization source. The timing offset unit 26 outputs the output timing pulses, whose phase has been controlled, to other circuits or the like that require synchronous processing.

Next, a flow of processes for applying an offset value according to the second exemplary embodiment of the present invention is explained with reference to FIG. 5. Firstly, the physical layer data receiving unit 24 receives a synchronization signal transmitted from the synchronization signal transmitting apparatus 13 through a physical layer of a SyncE transmission path. Further, the physical layer data receiving unit 24 synchronizes the frequency of a signal generated by using an oscillator with the frequency of the received synchronization signal and thereby outputs an output clock (S11).

Next, the pulse generation unit 25 generates output timing pulses by using the output clock output from the physical layer data receiving unit 24 (S12).

Next, the packet data receiving unit 27 receives a synchronization signal transmitted through the IEEE1588 transmission (S13). The packet data receiving unit 27 generates timing pulses based on the received synchronization signal.

Next, the phase comparison unit 28 measures phase differences between the output timing pulses output from the pulse generation unit 25 and the timing pulses output from the packet data receiving unit 27 (S14). For example, the phase comparison unit 28 measures phase differences between the output timing pulses and the timing pulses output from the packet data receiving unit 27 in a predetermined period, and thereby generates information about a plurality of phase differences.

The phase comparison unit 28 determines whether or not there is a phase difference that is greater than a pre-defined threshold in the generated information about the plurality of phase differences (S15). When it is determined that there is a phase difference greater than the pre-defined threshold among the plurality of measured phase differences by the phase comparison unit 28 (S15, Yes), the process in the step S13 is repeated. When the phase difference is larger, it can be presumed that fluctuations in the timing pulses are large. In such cases, it is very difficult to correct and conform the phase of the output timing pulses to the phase of the pulse signal generated based on the synchronization signal of the phase source based on the timing pulses having large fluctuations. Therefore, it is controlled so that the process in the step S13, in which packet data are acquired, is repeated.

When it is determined that there is no phase difference greater than the pre-defined threshold among the plurality of measured phase differences by the phase comparison unit 28 (S15, No), the offset value calculation unit 29 statistically processes the information about the plurality of phase differences and thereby calculates an offset value to be applied to the output timing pulses (S16). Next, the timing offset unit 26 applies the offset value calculated by the offset value calculation unit 29 to the output timing pulses (S17).

As explained above, by using the synchronization apparatus 20 according to the second exemplary embodiment of the present invention, it is possible to generate output timing pulses by using the synchronization signal transmitted through the physical layer of the SyncE transmission path or the like and the synchronization signal transmitted through the IEEE1588 transmission or the like.

Note that the synchronization signal transmitted through the physical layer of the SyncE transmission path or the like is transmitted without being affected by the congestion of packet data and the like in the network. Therefore, when synchronization signals are received in the synchronization apparatus 20, no fluctuation occurs in the arrival intervals of the synchronization signals. Accordingly, the frequency of the output clock that is generated in synchronization with the frequency of the synchronization signal coincides with the frequency of the synchronization signal. As a result, the pulse intervals of the output timing pulses generated by using the output clock are constant intervals.

Since synchronization signals transmitted through the IEEE1588 transmission are affected by congestion of packet data and the like, fluctuations occur in their arrival intervals in the synchronization apparatus 20. However, it is possible to calculate an offset value for reducing the effect of the synchronization signal fluctuations and thereby correcting the phase of the output timing pulses by statistically processing phase differences between the output timing pulses, whose pulse intervals are constant, and the timing pulses, in which fluctuations occur. As described above, by using the offset value for reducing the effect of the synchronization signal fluctuations, the phase of the output timing pulses can be conformed to the phase of the pulse signal determined based on the synchronization signal of the synchronization source. In this way, the synchronization apparatus 20 according to the second exemplary embodiment can generate highly accurate output timing pulses.

Third Exemplary Embodiment

Next, a configuration example of a synchronization system according to a third exemplary embodiment of the present invention is explained with reference to FIG. 6. A synchronization system shown in FIG. 6 includes a GNSS satellite 11, a GNSS receiver 14, a packet data transmission apparatus 15, a GNSS receiver 16 and a synchronization apparatus 20. The GNSS satellite 11 and the phase synchronization control unit 22 are similar to those shown in FIG. 2, and therefore their detailed explanations are omitted.

The GNSS receiver 14 receives a GNSS broadcast signal transmitted from the GNSS satellite 11, reproduces a synchronization signal based on the received GNSS broadcast signal, and transmits the reproduced synchronization signal to the packet data transmission apparatus 15.

The packet data transmission apparatus 15 transmits the synchronization signal to the synchronization apparatus 20 through a packet network 31. The synchronization signal is, for example, a clock signal generated by using the synchronization signal transmitted from the GNSS receiver 14. The packet network 31 is a network through which communication specified in the IEEE1588 can be performed.

The GNSS receiver 16 receives the GNSS broadcast signal transmitted from the GNSS satellite 11, reproduces a synchronization signal based on the received GNSS broadcast signal, and transmits the reproduced synchronization signal to an SDH apparatus 17. The SDH apparatus 17 is an apparatus capable of performing data transmission by using an SDH in a physical layer. The SDH apparatus 17 transmits the synchronization signal to the synchronization apparatus 20 through a network in which an SDH is specified in its physical layer (hereinafter, referred to as "SDH network 32").

Figure 2:
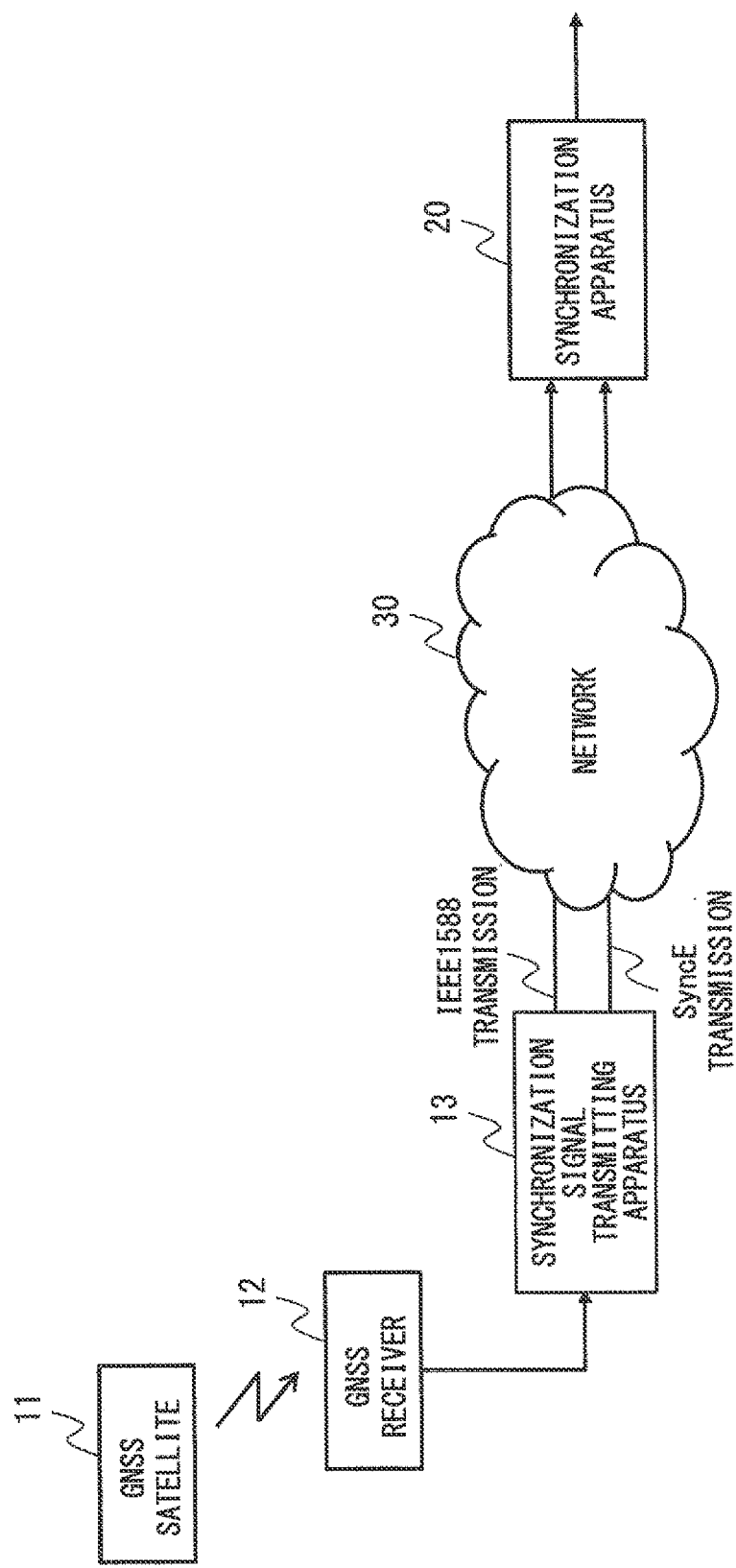
FIG. 2 is a configuration diagram of a synchronization system according to a second exemplary embodiment.

Similarly to FIG. 2, the synchronization apparatus 20 generates output timing pulses by using a frequency synchronization signal (output clock) synchronized with the frequency of a synchronization signal transmitted from the SDH apparatus 17 and a phase synchronization signal (timing pulse) synchronized with the phase of a synchronization signal transmitted from the packet data transmission apparatus 15. Note that the packet data transmission apparatus 15 and the SDH apparatus 17 need to transmit respective synchronization signals that are generated by using a broadcast signal transmitted from the same synchronization source apparatus, i.e., from the same GNSS satellite 11, to the synchronization apparatus 20.

Next, an operation in a case where the GNSS receiver 16 cannot receive the GNSS broadcast signal is explained with reference to FIG. 7.

Figure 7:
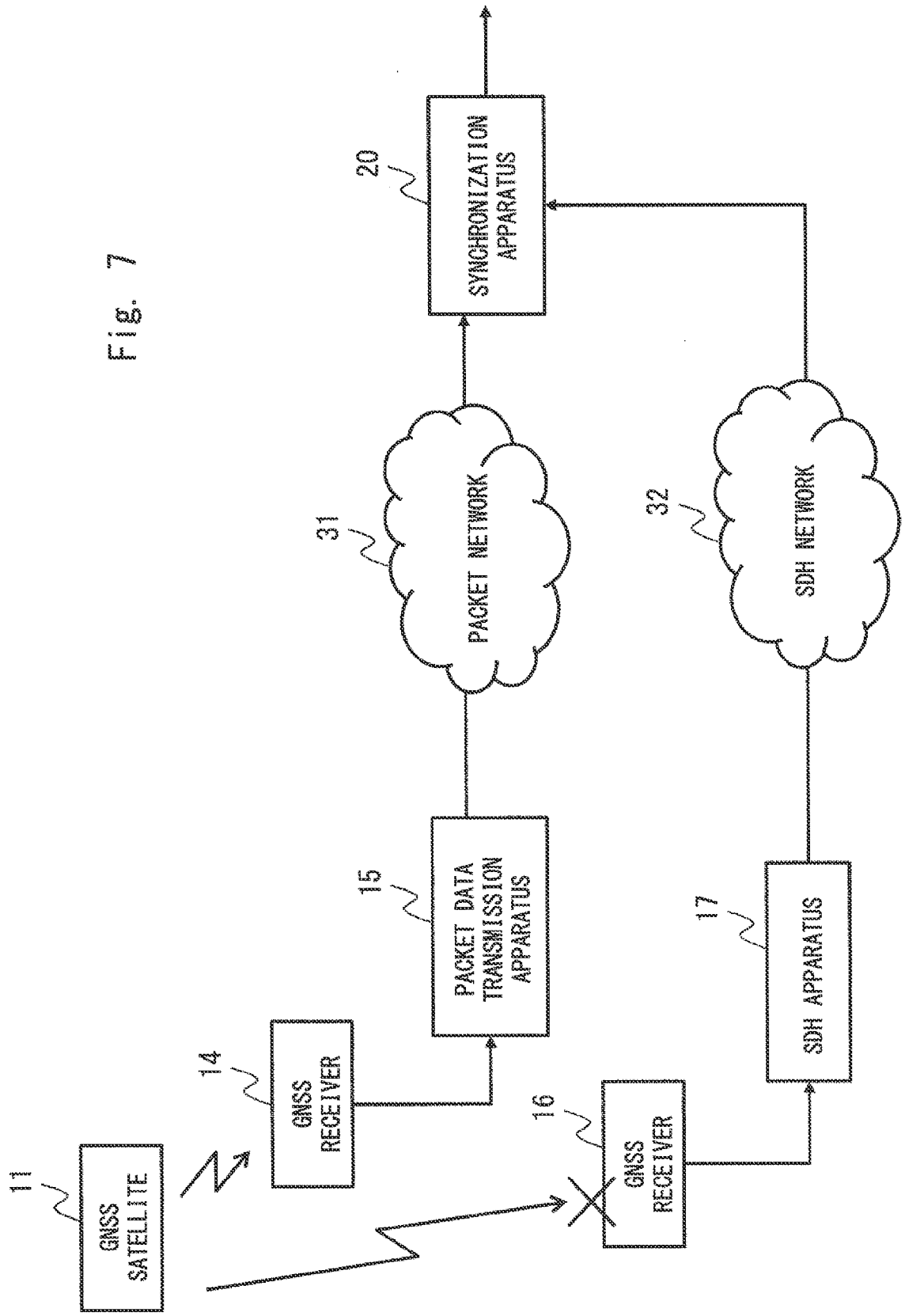
FIG. 7 is a configuration diagram of a synchronization apparatus according to the third exemplary embodiment.

FIG. 7 shows a case where the GNSS receiver 16 cannot receive the GNSS broadcast signal from the GNSS satellite 11. In such cases, the GNSS receiver 16 outputs a clock signal that is generated by using an oscillator disposed in the GNSS receiver 16 itself to the SDH apparatus 17. The state where the GNSS receiver 16 generates a clock signal by using an oscillator disposed in the GNSS receiver 16 itself, instead of generating a synchronization signal based on the GNSS broadcast signal transmitted from the GNSS satellite 11, and operates based on the generated clock signal as described above is called a "free-running" state.

The packet data transmission apparatus 15 transmits the synchronization signal transmitted from the GNSS satellite 11 to the synchronization apparatus 20, and the SDH apparatus 17 transmits the synchronization signal generated based on the clock signal generated in the GNSS receiver 16 to the synchronization apparatus 20. In this case, since the generation sources of the two synchronization signals received by the synchronization apparatus 20 are different from each other, the frequencies of the two synchronization signals are different from each other. In such cases, the synchronization apparatus 20 may refrain from performing the synchronous processing until the GNSS receiver 16 can receive the GNSS broadcast signal transmitted from the GNSS satellite 11.

Next, a flow of processes in a case where the synchronization apparatus 20 receives a synchronization signal generated based on a clock internally generated by the GNSS receiver 16 is explained with reference to FIG. 8.

Figure 5:
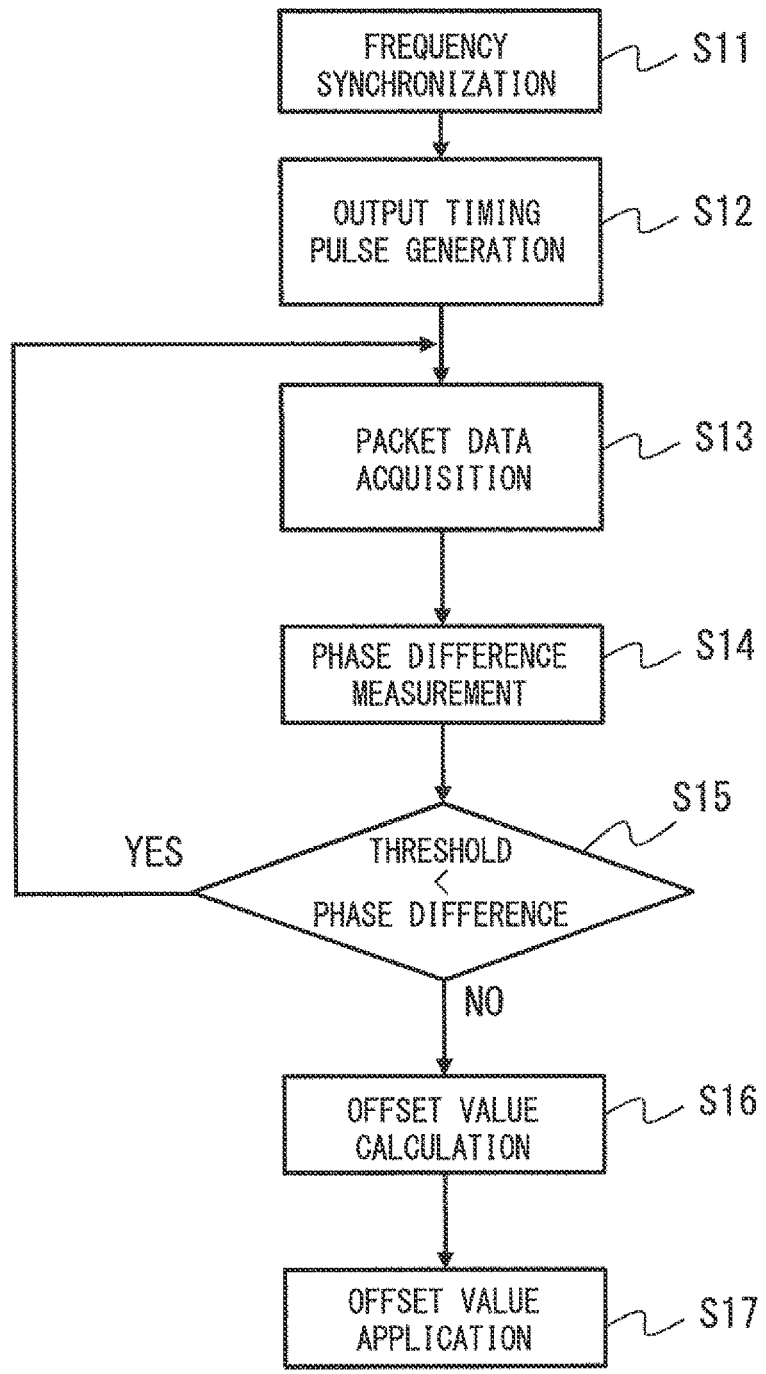
FIG. 5 is a diagram showing a flow of processes for applying an offset value according to the second exemplary embodiment.
Figure 8:
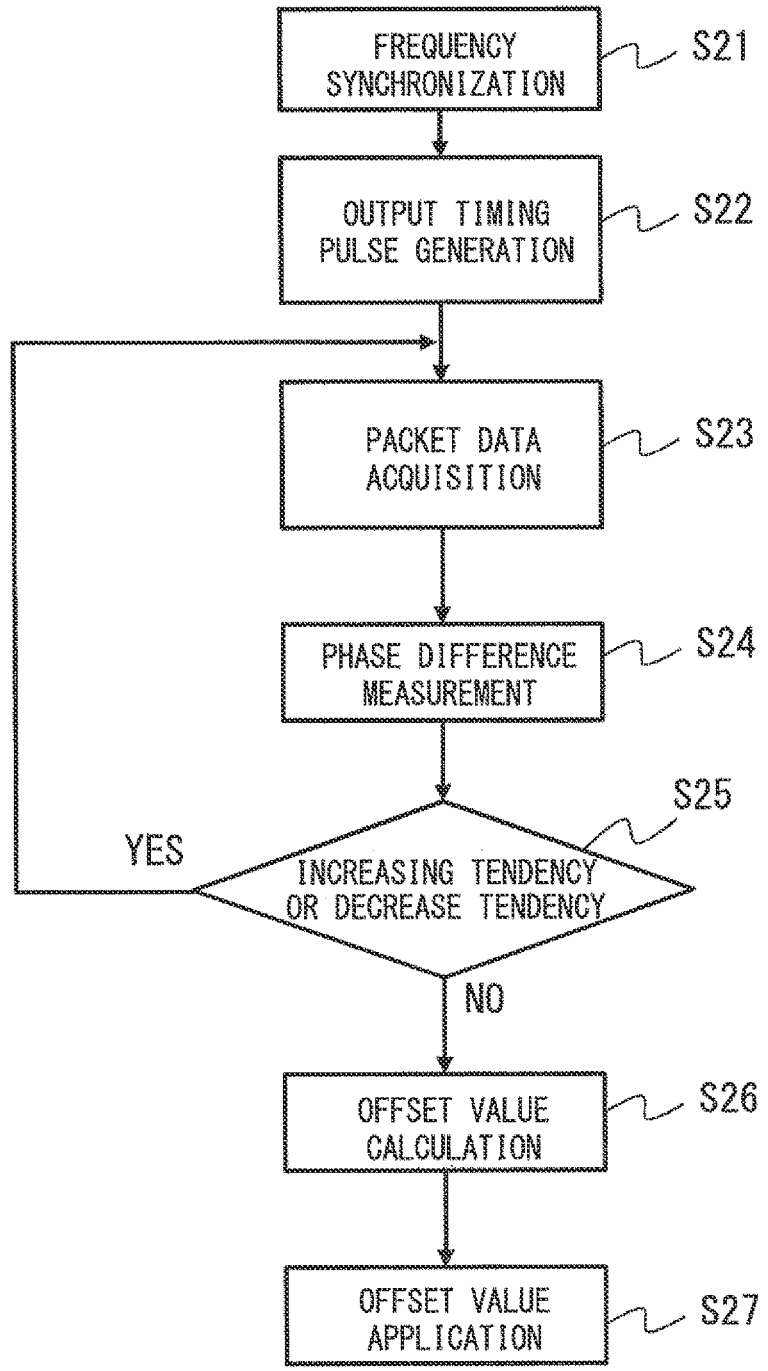
FIG. 8 is a diagram showing a process flow for applying an offset value according to the third exemplary embodiment.

Steps S21 to S24 in FIG. 8 are similar to the steps S11 to S14 in FIG. 5, and therefore their detailed explanations are omitted. The phase comparison unit 28 determines whether or not a plurality of phase differences measured in the step S24 tend to increase or decrease over time (S25).

Figure 9A:
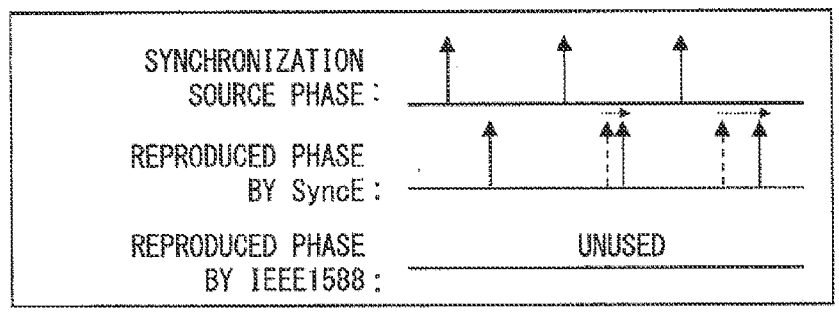
FIG. 9A is a diagram for explaining a phase deviation of a pulse signal according to a third exemplary embodiment.

Here, phase differences that are obtained when the frequencies of synchronization signals transmitted from the packet data transmission apparatus 15 and the SDH apparatus 17 are different form each other are explained with reference to FIGS. 9A and 9B. FIG. 9A shows a state of output timing pulses generated in the step S22 shown in FIG. 8. The output timing pulses are shown as reproduced phases by the SyncE. In this example, it is assumed that the frequency of the synchronization signal transmitted form the SDH apparatus 17 is lower than the frequency of the synchronization source phase, i.e., the pulse signal generated based on the GNSS broadcast signal. Therefore, the pulse width of the output timing pulses becomes longer than the pulse width of the pulse signal generated based on the GNSS broadcast signal. The vertical dotted-line arrows in FIG. 9A represent output timing pulses when the frequency of the synchronization source phase is equal to that of the synchronization signal transmitted from the SDH apparatus 17. FIG. 9A shows a state where the pulse widths for the second and third output timing pulses gradually become longer compared to the case where the frequencies of the synchronization signals transmitted from the packet data transmission apparatus 15 and the SDH apparatus 17 are equal to each other.

Figure 9B:
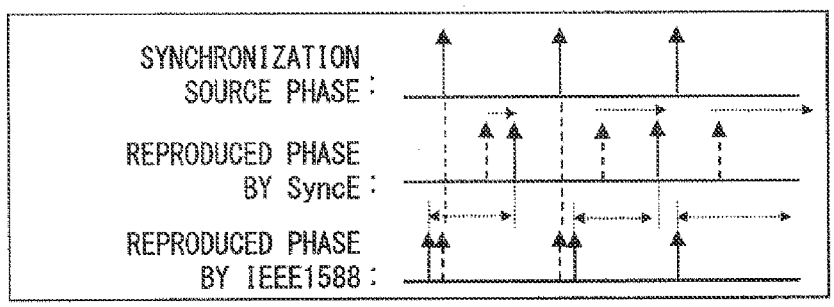
FIG. 9B is a diagram for explaining a phase deviation of a pulse signal according to the third exemplary embodiment.

Similarly to FIG. 4B, FIG. 9B shows a state where a deviation occurs between the phase of the pulse signal generated based on the synchronization signal of the synchronization source (i.e., the pulse signal generated based on the synchronization signal output from the GNSS receiver 12) and that of the output timing pulses. Note that when the pulse width of the output timing pulses gradually becomes longer, the phase difference between the output timing pulses and the timing pulses has an increasing tendency, i.e., gradually increases. Note that while the phases of the timing pulses reproduced by the IEEE1588 may be somewhat advanced or delayed due to the fluctuations in the arrival times, the phase difference between the output timing pulses and the timing pulses has an increase tendency.

In FIGS. 9A and 9B, a case where the frequency of the synchronization signal transmitted form the SDH apparatus 17 is lower than that of the synchronization signal output from the packet data transmission apparatus 15 is shown. In contrast to this, when the frequency of the synchronization signal transmitted form the SDH apparatus 17 is higher than that of the synchronization signal output from the packet data transmission apparatus 15, the phase difference between the output timing pulses and the timing pulses has a decreasing tendency.

Referring to FIG. 8 again, in the step S25, when it is determined that the plurality of measured phase differences tend to increase or decrease over time by the phase comparison unit 28 (S25, Yes), the process in the step S23 is repeated. It can be presumed that when it is determined that the plurality of measured phase differences tend to increase or decrease over time by the phase comparison unit 28, the synchronization signal output from the SDH apparatus 17 is not generated based on the GNSS broadcast signal but is generated based on a signal output from the oscillator disposed in the GNSS receiver 16 connected to the SDH apparatus 17. Therefore, in such cases, the process in the step S23 is repeated until the synchronization signal generated based on the GNSS broadcast signal is transmitted from the SDH apparatus 17.

In the step S25, when it is determined that the plurality of measured phase differences tend to neither increase nor decrease over time by the phase comparison unit 28 (S25, No), the processes in the steps S26 and S27 are performed. The steps S26 and S27 are similar to the steps S16 and S17 in FIG. 5, and therefore their detailed explanations are omitted.

Figure 6:
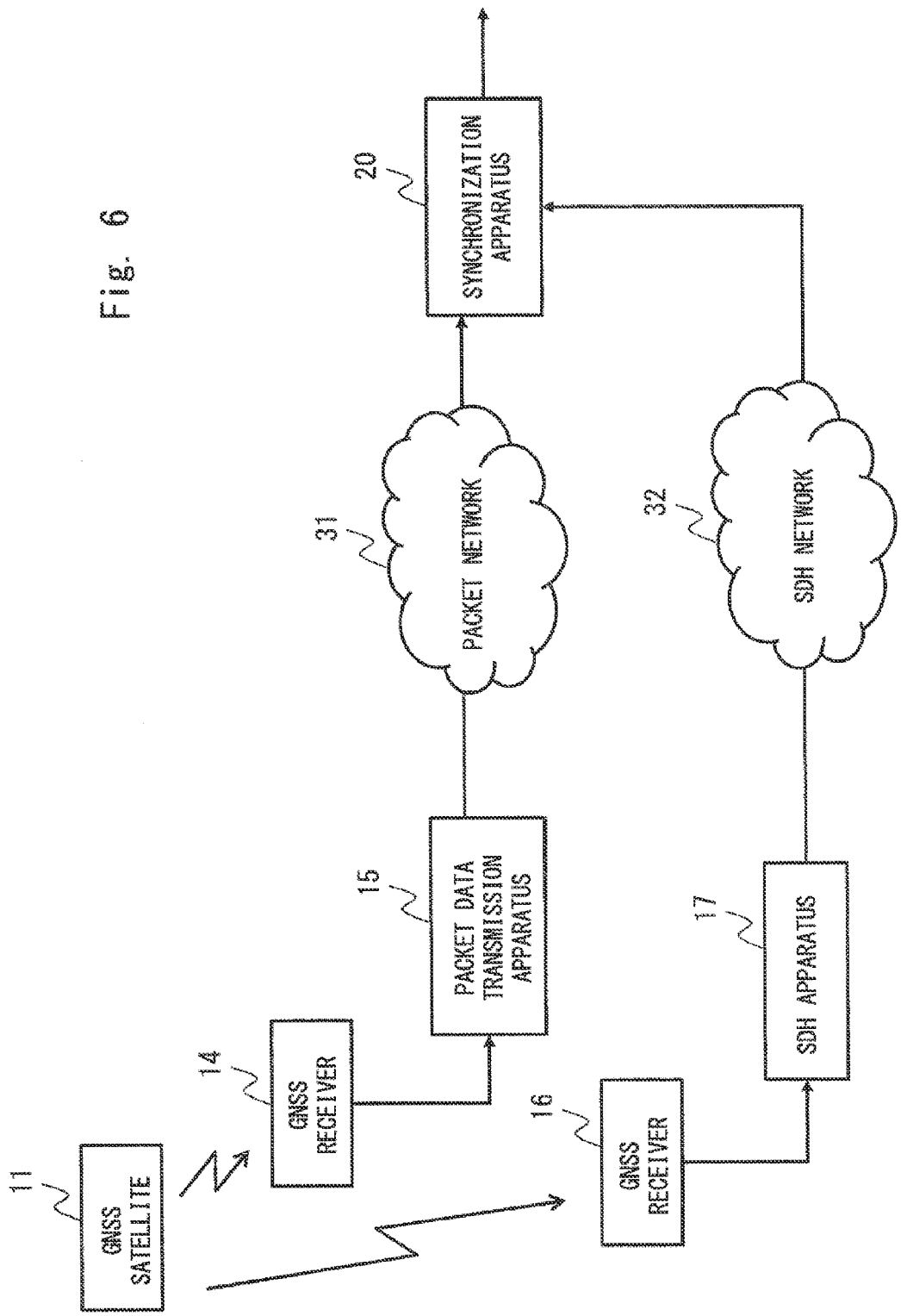
FIG. 6 is a configuration diagram of a synchronization apparatus according to a third exemplary embodiment.

As explained above, by using the synchronization system shown in FIG. 6, the synchronization apparatus 20 can receive synchronization signals used for performing frequency synchronization and phase synchronization through different networks, i.e., the packet network 31 and the SDH network 32. As a result, even when there is an apparatus that can perform only the IEEE1588 transmission or an apparatus that can perform only the SDH transmission, the synchronization apparatus 20 can receive a synchronization signal from each of these apparatuses.

Further, in FIG. 6, a configuration in which the packet data transmission apparatus 15 receives a synchronization signal from the GNSS receiver 14 and the SDH apparatus 17 receives a synchronization signal from the GNSS receiver 16 is explained. However, the packet data transmission apparatus 15 and the SDH apparatus 17 may be connected to the common GNSS receiver.

Further, the synchronization apparatus 20 can determine whether or not a transmitted synchronization signal has been generated based on the GNSS broadcast signal by determining whether or not the phase difference between synchronization signals transmitted from the packet data transmission apparatus 15 and the SDH apparatus 17 has an increasing tendency or a decreasing tendency. In this way, the synchronization apparatus 20 does not perform the offset value calculation when the synchronization signal generated based on the GNSS broadcast signal is not transmitted, and does perform the offset value calculation when the synchronization signal generated based on the GNSS broadcast signal is transmitted. Therefore, the synchronization apparatus 20 can calculate a highly accurate offset value.

Fourth Exemplary Embodiment

Figure 10:
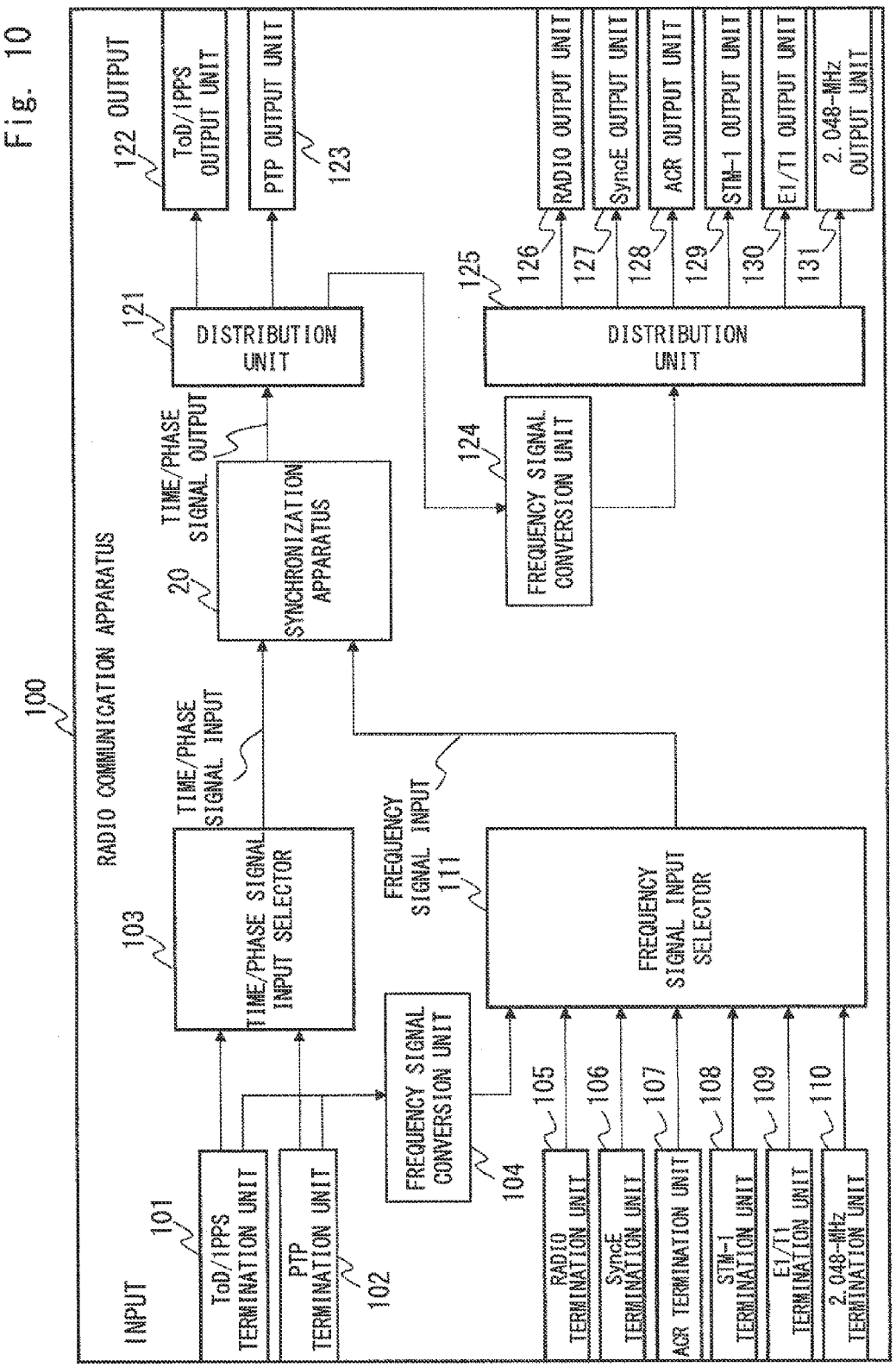
FIG. 10 is a configuration diagram of a radio communication apparatus according to a fourth exemplary embodiment.

Next, a configuration example of a radio communication apparatus 100 according to a fourth exemplary embodiment is explained with reference to FIG. 10. The radio communication apparatus 100 is an apparatus including a synchronization apparatus 20. The radio communication apparatus 100 includes in addition to the synchronization apparatus 20, a ToD/1 PPS termination unit 101, a PTP termination unit 102, a time/phase signal input selector 103, a frequency signal conversion unit 104, a radio termination unit 105, a SyncE termination unit 106, an ACR termination unit 107, an STM-1 termination unit 108, an E1/T1 termination unit 109, a 2.048-MHz termination unit 110, a frequency signal input selector 111, a distribution unit 121, a ToD/1 PPS output unit 122, a PTP output unit 123, a frequency signal conversion unit 124, a distribution unit 125, a radio output unit 126, a SyncE output unit 127, an ACR output unit 128, an STM-1 output unit 129, an E1/T1 output unit 130, and a 2.048-MHz output unit 131.

The ToD/1 PPS termination unit 101 receives a time/phase signal including a signal relating to a time specified in NMEA-0183, IRIG Std.200-04, or the like, and a signal that indicates a phase by using 1 PPS (Pulse Per Second). The PTP termination unit 102 receives a time/phase signal used in a packet network standardized in ITU-T G.8265.1, IEEE1588-2008, or the like.

The time/phase signal input selector 103 receives the time/phase signals from the ToD/1 PPS termination unit 101 and the PTP termination unit 102, and outputs a selected one of these time/phase signals to the synchronization apparatus 20.

The frequency signal conversion unit 104 receives the time/phase signals from the ToD/1 PPS termination unit 101 and the PTP termination unit 102, and outputs a frequency signal indicating frequency information of the time/phase signals to the frequency signal input selector 111.

The radio termination unit 105 receives a radio signal through an antenna or the like, and outputs a frequency signal indicating frequency information of the received radio signal to the frequency signal input selector 111. The SyncE termination unit 106 and the ACR (Adaptive Clock Recovery) termination unit 107 receive a signal standardized in ITU-T G.8261 or the like, and output a frequency signal indicating frequency information of the received signal to the frequency signal input selector 111.

The STM-1 termination unit 108, the E1/T1 termination unit 109, and the 2.048-MHz termination unit 110 receive a signal standardized in ITU-T G.703 or the like, and output a frequency signal indicating frequency information of the received signal to the frequency signal input selector 111.

The frequency signal input selector 111 outputs one frequency signal selected from among the received frequency signals to the synchronization apparatus 20. The synchronization apparatus 20 applies an offset value to the time/phase signal by using the received time/phase signal and the frequency signal as explained above with reference to FIG. 3. The synchronization apparatus 20 outputs the time/phase signal, to which the offset value has been applied, to the distribution unit 121. Note that the time/phase signal output from the synchronization apparatus 20 corresponds to the output timing pulses explained above with reference to FIG. 3. Further, the frequency signal and the time/phase signal output to the synchronization apparatus 20 correspond to the respective synchronization signals.

The distribution unit 121 distributes and outputs the time/phase signal received from the synchronization apparatus 20 to the ToD/1 PPS output unit 122 and the PTP output unit 123. The ToD/1 PPS output unit 122 and the PTP output unit 123 outputs the received time/phase signal to other apparatuses and the like. Further, the distribution unit 121 outputs the time/phase signal received from the synchronization apparatus 20 to the frequency signal conversion unit 124.

The frequency signal conversion unit 124 converts the time/phase signal received from the distribution unit 121 into a frequency signal indicating frequency information. The frequency signal conversion unit 124 outputs the frequency signal to the distribution unit 125.

The distribution unit 125 outputs the frequency signal received from the frequency signal conversion unit 124 to at least one of the radio output unit 126, the SyncE output unit 127, the ACR output unit 128, the STM-1 output unit 129, the E1/T1 output unit 130, and the 2.048-MHz output unit 131.

The radio output unit 126, the SyncE output unit 127, the ACR output unit 128, the STM-1 output unit 129, the E1/T1 output unit 130, and the 2.048-MHz output unit 131 output the received frequency signal to other apparatuses and the like.

As explained above, by using the radio communication apparatus 100 according to the fourth exemplary embodiment of the present invention, it is possible to output a signal that is selected from among a plurality of signals standardized by various methods to the synchronization apparatus 20. Therefore, the synchronization apparatus 20 can generate a highly accurate time/phase signal (output timing pulses) or a frequency synchronization signal by using a plurality of signals standardized by different methods. Consequently, the radio communication apparatus 100 can operate in various networks using different methods, thus enabling flexible network designing.

Note that the invention is not limited to the above-described exemplary embodiments and various changes may be made therein without departing from the spirit and scope of the present invention.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent applications No. 2012-260716, filed on Nov. 29, 2012, the disclosure of which is incorporated herein in its entirety by reference.

REFERENCE SIGNS LIST

10 SYNCHRONIZATION SIGNAL SOURCE
11 GNSS SATELLITE
12 GNSS RECEIVER
13 SYNCHRONIZATION SIGNAL TRANSMITTING APPARATUS
14 GNSS RECEIVER
15 PACKET DATA TRANSMISSION APPARATUS
16 GNSS RECEIVER
17 SDH APPARATUS
20 SYNCHRONIZATION APPARATUS
21 FREQUENCY SYNCHRONIZATION UNIT
22 PHASE SYNCHRONIZATION CONTROL UNIT
23 PHASE SYNCHRONIZATION UNIT
24 PHYSICAL LAYER DATA RECEIVING UNIT
25 PULSE GENERATION UNIT
26 TIMING OFFSET UNIT
27 PACKET DATA RECEIVING UNIT
28 PHASE COMPARISON UNIT
29 OFFSET VALUE CALCULATION UNIT
30 NETWORK
31 PACKET NETWORK
32 SDH NETWORK
100 RADIO COMMUNICATION APPARATUS
101 ToD/1 PPS TERMINATION UNIT
102 PTP TERMINATION UNIT
103 TIME/PHASE SIGNAL INPUT SELECTOR
104 FREQUENCY SIGNAL CONVERSION UNIT
105 RADIO TERMINATION UNIT
106 SyncE TERMINATION UNIT
107 ACR TERMINATION UNIT
108 STM-1 TERMINATION UNIT
109 E1/T1 TERMINATION UNIT
110 2.048-MHz TERMINATION UNIT
111 FREQUENCY SIGNAL INPUT SELECTOR
121 DISTRIBUTION UNIT
122 ToD/1 PPS OUTPUT UNIT
123 PTP OUTPUT UNIT
124 FREQUENCY SIGNAL CONVERSION UNIT
125 DISTRIBUTION UNIT
126 RADIO OUTPUT UNIT
127 SyncE OUTPUT UNIT
128 ACR OUTPUT UNIT
129 STM-1 OUTPUT UNIT
130 E1/T1 OUTPUT UNIT
131 2.048-MHz OUTPUT UNIT

The invention claimed is:
1. A synchronization apparatus comprising:
at least one memory storing instructions, and
at least one processor configured to execute the instructions to:
perform frequency synchronization based on a synchronization signal transmitted from a synchronization signal source through a network, and output a frequency synchronization signal;
perform phase synchronization based on another synchronization signal transmitted from the synchronization signal source through a network, and output a phase synchronization signal; and generate an offset value by using a phase difference between the frequency synchronization signal and the phase synchronization signal, and correct a phase of the frequency synchronization signal by using the offset value.

2. The synchronization apparatus according to claim 1, wherein the at least one processor is further configured to execute the instructions to receive the synchronization signal transmitted from the synchronization signal source through a packet network.

3. The synchronization apparatus according to claim 1, wherein the at least one processor is further configured to execute the instructions to receive the synchronization signal transmitted from the synchronization signal source through a signal transmitted by using a physical layer.

4. The synchronization apparatus according to claim 1, wherein
the frequency synchronization signal is a frequency synchronization pulse signal having a pulse waveform, and the phase synchronization signal is a phase synchronization pulse signal having a pulse waveform, and
the at least one processor is further configured to execute the instructions to
calculate phase differences between the frequency synchronization pulse signal and the phase synchronization pulse signal in a predetermined period; and
correct a phase of the frequency synchronization signal by using an offset value, the offset value being generated by statistically processing a plurality of phase differences.

5. The synchronization apparatus according to claim 4, wherein the at least one processor is further configured to execute the instructions to not generate the offset value when the calculated phase difference is greater than a pre-defined value.

6. The synchronization apparatus according to claim 4, wherein the at least one processor is further configured to execute the instructions to not generate the offset value when a second phase difference between the frequency synchronization pulse signal and the phase synchronization pulse signal in a second predetermined period is greater than a first phase difference between the frequency synchronization pulse signal and the phase synchronization pulse signal in a first predetermined period by a pre-defined value, the second predetermined period being different from the first predetermined period.

7. The synchronization apparatus according to claim 4, wherein the at least one processor is further configured to execute the instructions to not generate the offset value when a second phase difference between the frequency synchronization pulse signal and the phase synchronization pulse signal in a second predetermined period is smaller than a first phase difference between the frequency synchronization pulse signal and the phase synchronization pulse signal in a first predetermined period by a pre-defined value, the second predetermined period being different from the first predetermined period.

8. A synchronization system comprising:
a synchronization signal source;
a synchronization signal transmitting apparatus that converts a synchronization signal transmitted from the synchronization signal source into a signal in a physical layer and transmits the converted signal as a first synchronization signal, and transmits the synchronization signal as a second synchronization signal through a packet network; and
a synchronization apparatus that generates a frequency synchronization signal by performing frequency synchronization based on the first synchronization signal, generates a phase synchronization signal by performing phase synchronization based on the second synchronization signal, and corrects a phase of the frequency synchronization signal by using an offset value, the offset value being generated by using a phase difference between the frequency synchronization signal and the phase synchronization signal.

9. The synchronization system according to claim 8, wherein the synchronization signal transmitting apparatus transmits the first and second synchronization signals to the synchronization apparatus through the same transmission path.

10. The synchronization system according to claim 8, wherein the synchronization signal transmitting apparatus transmits the first and second synchronization signals to the synchronization apparatus through different transmission paths.

11. The synchronization system according to claim 8, further comprising a first synchronization signal transmitting apparatus that receives a synchronization signal transmitted from the synchronization signal source, and a second synchronization signal transmitting apparatus that receives a synchronization signal transmitted from the synchronization signal source, wherein
the first synchronization signal transmitting apparatus transmits the first synchronization signal to the synchronization apparatus, and the second synchronization signal transmitting apparatus transmits the second synchronization signal to the synchronization apparatus.

12. A radio communication apparatus comprising:
at least one memory storing instructions, and
at least one processor configured to execute the instructions to:
receive a first plurality of synchronization signals from a synchronization signal source through a network, the first plurality of synchronization signals being used for frequency synchronization;
receive second plurality of synchronization signals from the synchronization signal source through a network, the second plurality of synchronization signals being used for phase synchronization;
perform frequency synchronization based on a selected synchronization signal of the first plurality of synchronization signals, and outputting a frequency synchronization signal;
perform phase synchronization based on a selected synchronization signal of the second plurality of synchronization signals, and outputting a phase synchronization signal; and
generate an offset value by using a phase difference between the frequency synchronization signal and the phase synchronization signal, and correcting a phase of the frequency synchronization signal by using the offset value.

13. A synchronization method comprising:
performing frequency synchronization based on a synchronization signal transmitted from a synchronization signal source through a network, and outputting a frequency synchronization signal;
performing phase synchronization based on another synchronization signal transmitted from the synchronization signal source through a network, and outputting a phase synchronization signal; and generating an offset value by using a phase difference between the frequency synchronization signal and the phase synchronization signal, and correcting a phase of the frequency synchronization signal by using the offset value.

\* \* \* \* \*